United States Patent [19]

Ohno

[11] Patent Number: 5,055,935
[45] Date of Patent: Oct. 8, 1991

[54] CONTROL DEVICE FOR A DIGITAL COPIER WITH SIMULTANEOUS OPERATIONS FOR READING A SUCCEEDING IMAGE WHILE REPRODUCING A PRECEDING IMAGE WITHOUT INTERRUPTION OF EITHER OPERATION UPON DETECTING AN ERROR WITH THE OPERATION

[75] Inventor: Katsuyuki Ohno, Yokohama, Japan

[73] Assignee: Ricoh Company, Ltd., Japan

[21] Appl. No.: 629,680

[22] Filed: Dec. 18, 1990

[30] Foreign Application Priority Data

Feb. 21, 1990 [JP] Japan .................................. 2-38446

[51] Int. Cl.⁵ .......................... H04N 1/21; H04N 1/23
[52] U.S. Cl. ................................. 358/296; 358/401; 358/444; 358/468
[58] Field of Search ............... 358/296, 300, 302, 404, 358/444, 401, 406, 472, 476, 468; 355/202, 206

[56] References Cited

U.S. PATENT DOCUMENTS 4,332,465  6/1982  Steury ................................. 355/202

Primary Examiner—Benjamin R. Fuller
Assistant Examiner—Scott A. Rogers
Attorney, Agent, or Firm—Mason, Fenwick & Lawrence

[57] ABSTRACT

A control device for a digital copier capable of writing digital image data and reading them out for reproduction. While reading digital image data representative of a preceding document out of a memory and reproducing them, the copier starts reading a succeeding document. When an error occurs in the operation for reading the succeeding document, the control device continues the operation for reproducing the preceding document without interrupting it. Likewise, when an error occurs in the operation for reproducing the preceding document, the control device continues the operation for reading the succeeding document without interrupting it.

3 Claims, 13 Drawing Sheets

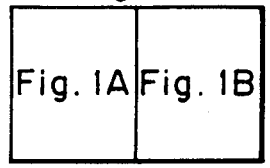
Fig. 1A
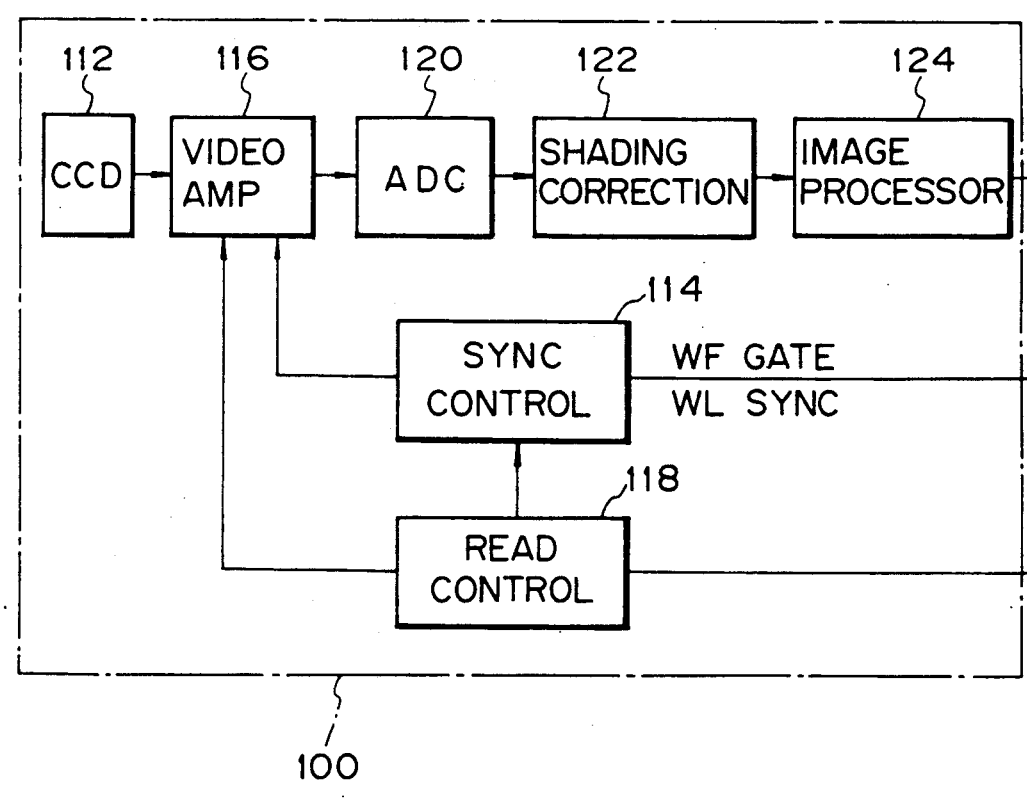

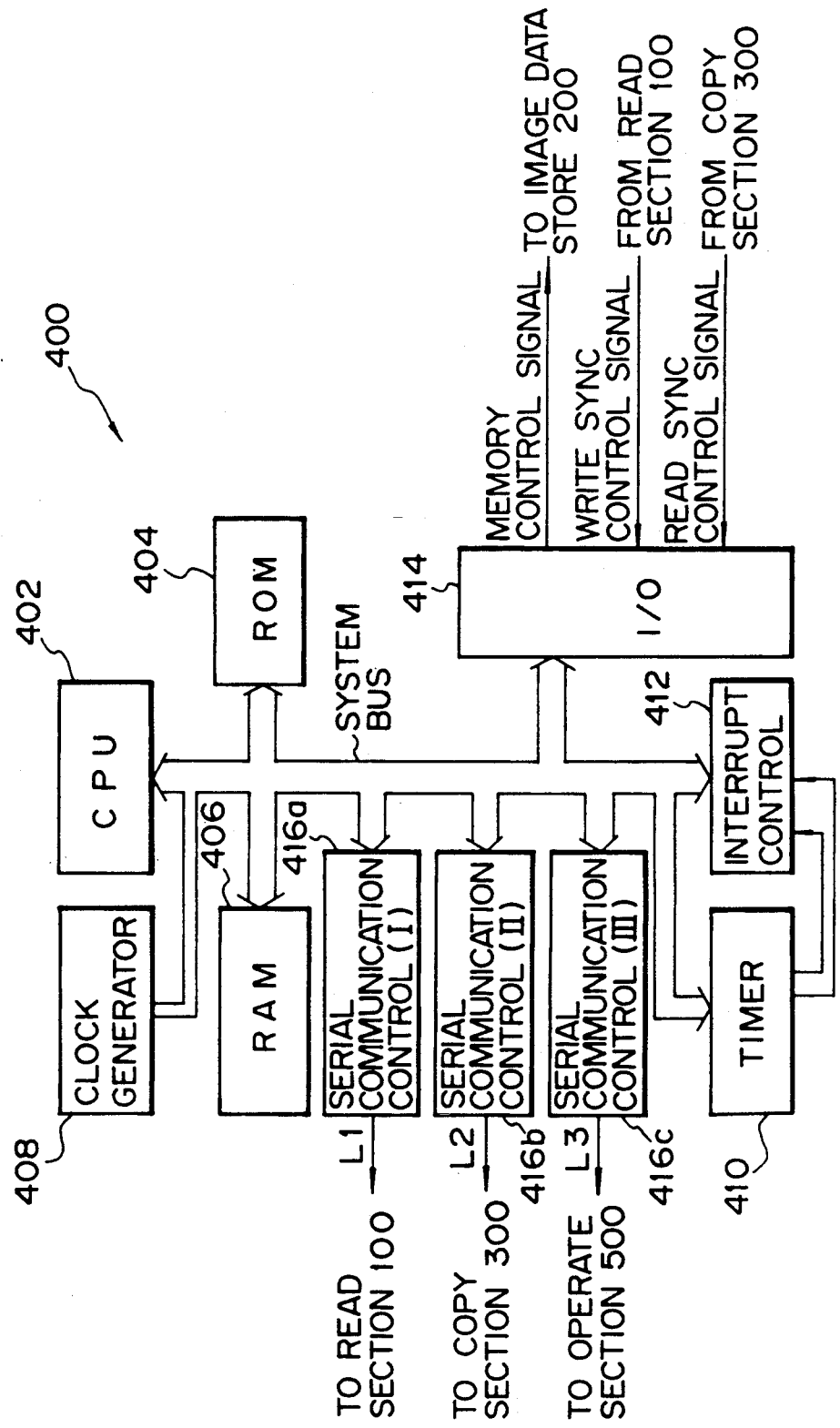

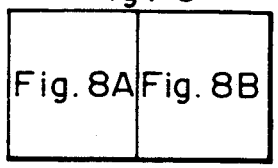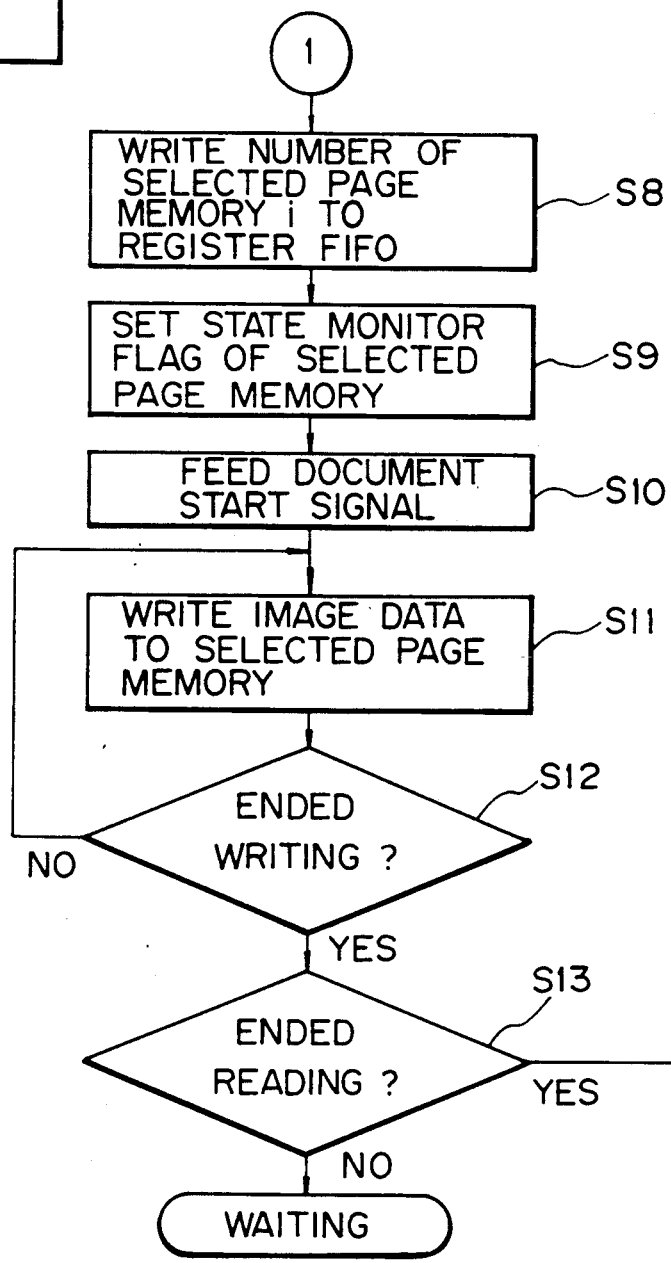

Fig. 10

| | | |
|---|---|---|
| 10000H | PAGE MEMORY A STATE MONITOR FLAG | |
| 10000H | PAGE MEMORY B STATE MONITOR FLAG | |
| 10002H | PAGE MEMORY C STATE MONITOR FLAG | |

| | 11000H | 11001H | 11002H | 11003H | 11004H | 11005H | 11006H | 11007H |
|---|---|---|---|---|---|---|---|---|
| FIFO | 01H | 02H | 03H | | | | | |

Fig. 11

| | |
|---|---|
| bit 7 | M – AVAIL |
| bit 6 | |
| bit 5 | |
| bit 4 | |
| bit 3 | M – BUSY |
| bit 2 | |
| bit 1 | |
| bit 0 | M – DONT |

CONTROL DEVICE FOR A DIGITAL COPIER WITH SIMULTANEOUS OPERATIONS FOR READING A SUCCEEDING IMAGE WHILE REPRODUCING A PRECEDING IMAGE WITHOUT INTERRUPTION OF EITHER OPERATION UPON DETECTING AN ERROR WITH THE OPERATION

BACKGROUND OF THE INVENTION

The present invention relates to a control device for a digital copier of the type writing digital image data and reading them out for reproduction.

There has been known a digital copier having a memory which is capable of storing digital image data representative of a single preceding document and a single succeeding document. This type of copier can read the succeeding document while reproducing the preceding document. When such a copier fails to read the succeeding document while reproducing the preceding document or to reproduce the preceding document while reading the succeeding document, it has been customary to down the entire system of the copier at the cost of operation efficiency. Generally, however, whether or not the operation for reproducing the preceding document succeeds and whether or not an error occurs in the operation for reading the succeeding document are not related to each other. Likewise, whether or not the operation for reading the succeeding document completes without fail and whether or not an error occurs in the operation for reproducing the preceding document are not related to each other. It is therefore preferable that the reproducing operation and the reading operation be completed individually with no regard to each other.

SUMMARY OF THE INVENTION

It is therefore an object of the present invention to provide a control device which allows a digital copier to complete the reproduction of a preceding document with no regard to whether or not it successfully reads a succeeding document, thereby enhancing efficient copying operations.

It is another object of the present invention to provide a control device which allows a digital copier to complete the reading of a succeeding document with no regard to whether or not it completely reproduces a preceding document, thereby enhancing efficient copying operations.

It is another object of the present invention to provide a generally improved control device for a digital copier.

In accordance with the present invention, a control device for a digital copier which writes digital image data and reads them out for reproduction comprises an image reading section for reading a document to produce a corresponding image density signal, a converting section for convertion the image density signal into corresponding digital image data, a storing section for storing the digital image data representative of a plurality of documents, a reproducing section for reproducing the digital image data, an error detecting section for detecting an error occurred in the image reading section or in the reproducing section, and a control section for controlling the image reading section, converting section, storing section, reproducing section and error detecting section such that the converting section converts the document read by the image reading section into digital image data, the digital image data is written to the storing section, and then the digital image data is read out of the storing section and reproduced by the reproducing section, and such that when an operation for reading a succeeding document begins while an operation for reading digital image data representative of a preceding document and causing the reproducing section to reproduce the image data is under way, the operation for reproducing the preceding document and the operation for reading the succeeding document each is completed with no regard to an error which may occur in the other operation.

Also, in accordance with the present invention, a control device for a digital copier which writes digital image data and reads them out for reproduction comprises an image reading section for reading a document to produce a corresponding image density signal, an error detecting section for detecting an error occurred in the image reading section, a converting section for converting the image density signal into corresponding digital image data, a storing section for storing the converted digital image data representative of a plurality of documents, a reproducing section for reproducing the digital image data, and a control section for controlling the image reading section, error detecting section, converting section, storing section and reproducing section such that the converting section converts the document read by the document reading section into corresponding digital image data, the converted digital image data is written to the storing section, and then the digital image data is read out and reproduced by the reproducing section, and such that when an operation for reading a succeeding document begins while an operation for reading digital image data representative of a preceding document and causing the reproducing section to reproduce the digital image data is under way, and an error is detected in the operation for reading the succeeding document, the operation for reproducing the preceding document is continued without interruption.

Further, in accordance with the present invention, a control device for a digital copier which writes digital image data and reads them out for reproduction comprises an image reading section for reading a document to produce a corresponding image density signal, a converting section for converting the image density signal into corresponding digital image data, a storing section for storing the converted digital image data representative of a plurality of documents, a reproducing section for reproducing the digital image data, an error detecting section for detecting an error occurred in the reproducing section, and a control section for controlling the image reading section, converting section, storing section, reproducing section and error detecting section such that the converting section converts the document read by the image reading section into corresponding digital image data, the digital image data is written to the storing section, and then the digital image data is read out and reproduced by the reproducing section, and such that when an operation for reading a succeeding document begins while an operation for reading the digital image data out of the storing section and causing the reproducing section to reproduce the digital image data is under way, and an error occurs in the operation for reproducing the preceding document, the operation for reading the succeeding document is continued without interruption.

BRIEF DESCRIPTION OF THE DRAWINGS

FIGS. 1A and 1B are a block diagram schematically showing a digital copier control device embodying the present invention;

FIG. 2 is a block diagram schematically showing a specific construction of a system control section included in the embodiment;

FIGS. 7, 8A, 8B, and 9 are flowcharts demonstrating a specific operation of a CPU included in the system control section of FIG. 2;

FIG. 10 shows data to be written to a RAM included in the system control section of FIG. 2;

FIG. 11 shows specific bit assignment of the RAM to data; and

DESCRIPTION OF THE PREFERRED EMBODIMENTS

Figure 1B:
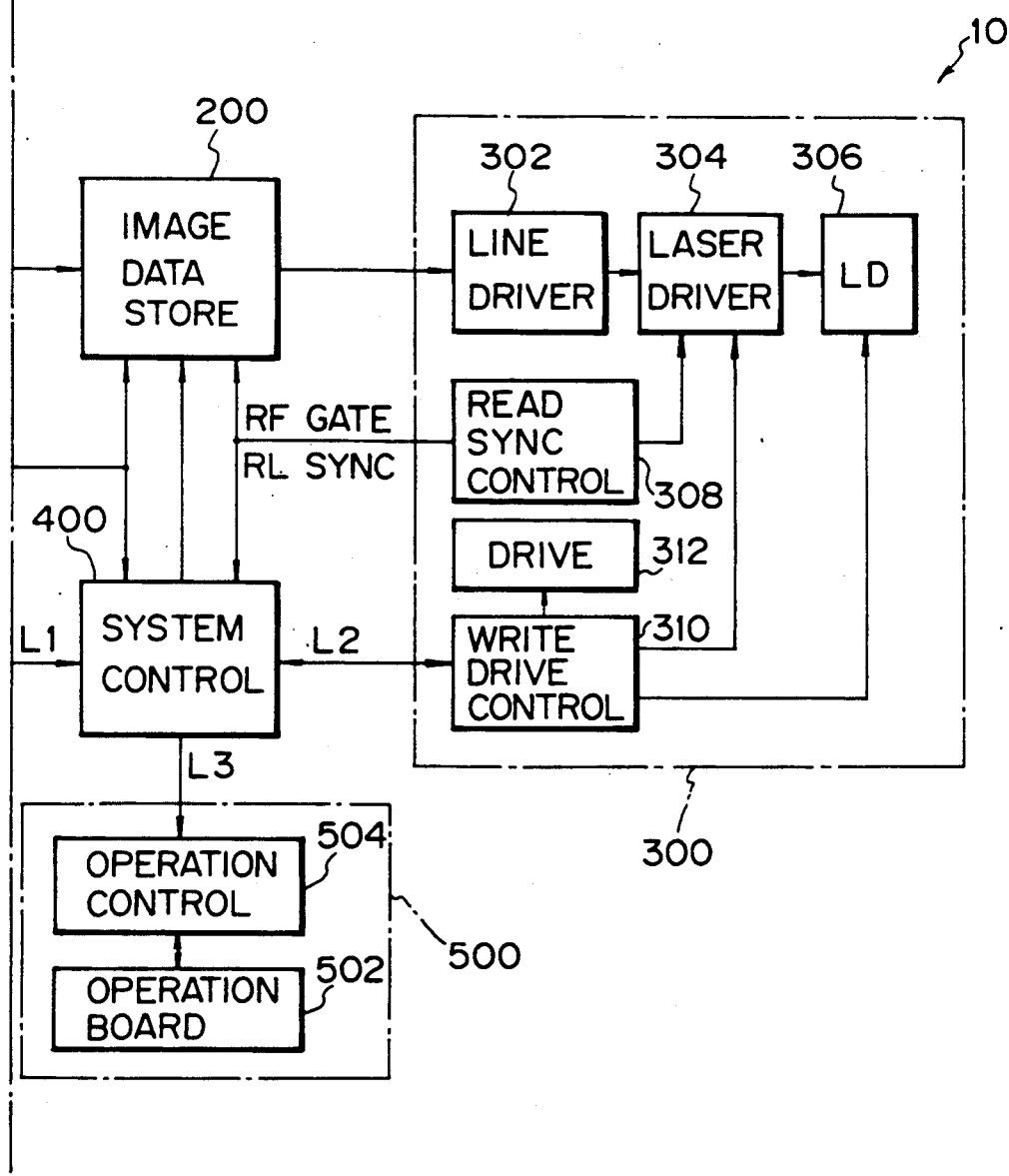

Referring to FIGS. 1A and 1B of the drawings, a control system embodying the present invention is shown and generally designated by the reference numeral 10. As shown, the control device 10 has a reading section 100 serving as means for reading a document. Image data produced by the reading section 100 is written to an image data storing section 200 which plays the role of storing means. A copying section 300 executes a sequence of steps for reproducing the image data on a paper sheet. A system control section 400 controls the sections 100, 200 and 300. An operating section 500 serves as operating means connected to the system control section 500 and has various keys arranged thereon. The operating section 500 includes a display for displaying various kinds of information.

FIG. 2 shows a specific construction of the system control section 400. This section 400 has a microprocessor (CPU) 402, a ROM 404, a RAM 406, a clock generator 408, a timer 410, an interrupt controller 412, and an I/O interface 414 interfacing the section 400 to the above-mentioned sections 100, 200, 300 and 500, and serial communication controllers I to III 416a to 416c.

Figure 3:
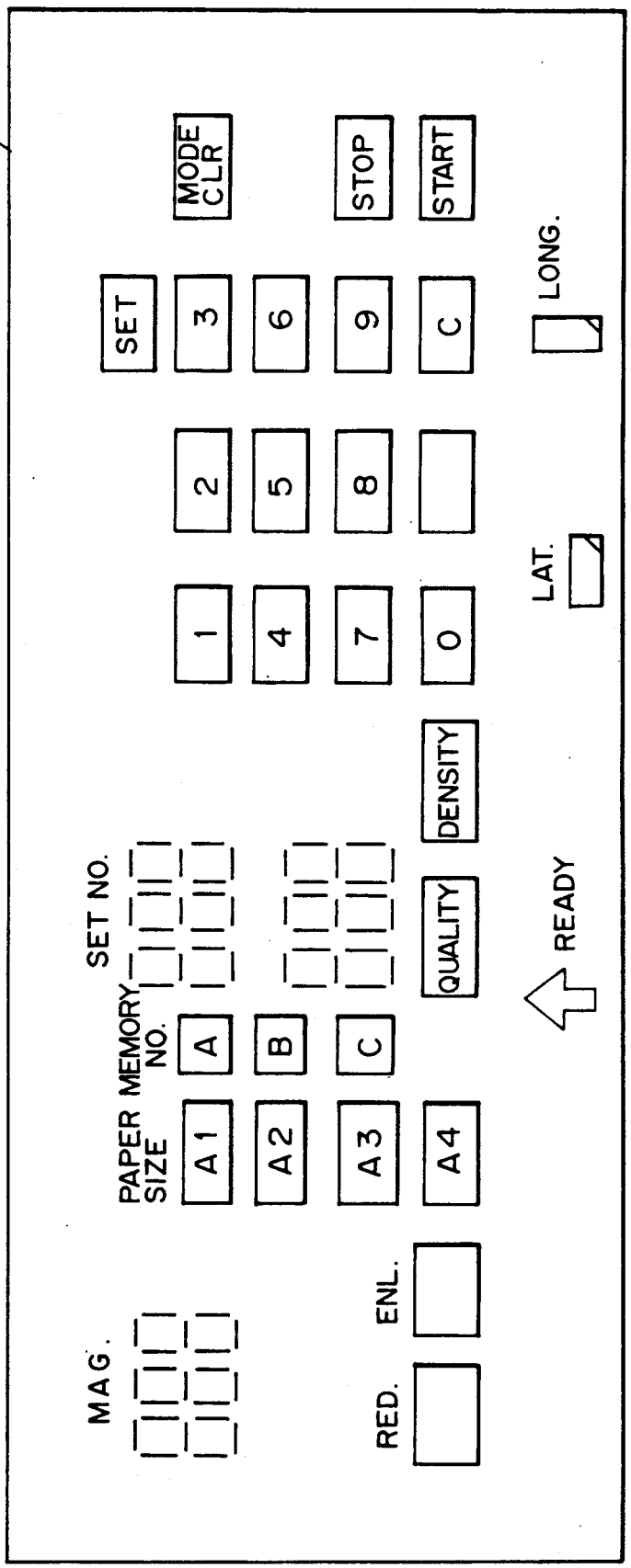
FIG. 3 is an enlarged plan view showing a specific arrangement of an operation board included in the embodiment.

Referring again to FIGS. 1A and 1B the operating section 500 has an operation board 502 and an operation control circuit 504. As shown in FIG. 3, the operation board 502 includes various keys such as a mode clear key, a stop key, a start key, numeral keys, a density select key, a picture quality select key, paper size select keys, an enlarge key, a reduce key, memory No. keys, and a set key, various character displays such as a set number display, a copy number display, and a magnification display, and various indicators such as a ready indicator and a direction indicator associated with the insertion of a document.

Figure 4:
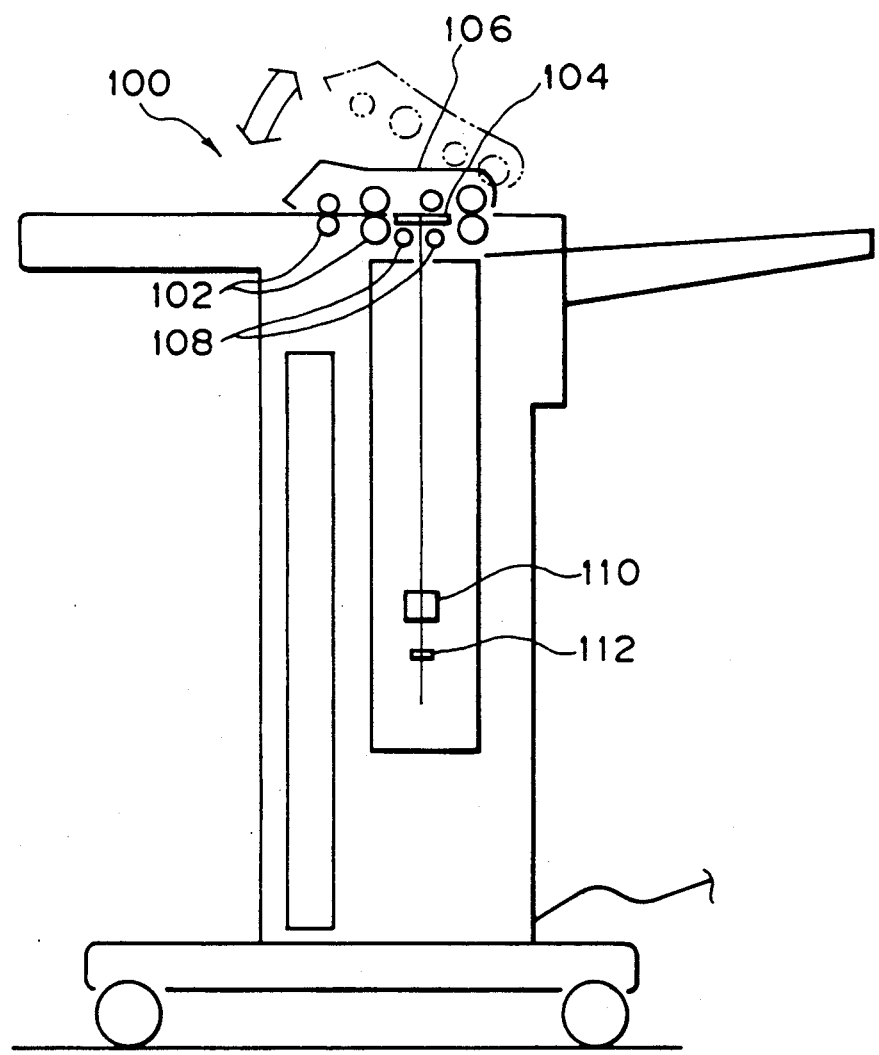
FIG. 4 is a sectional side elevation showing a specific construction of a reading section included in the embodiment.

FIG. 4 shows a specific mechanical arrangement of the reading section 100. When the operator inserts a document to between roller pairs 102, the document is transported by the roller pairs 102 along a path which is defined between a glass platen 104 and a reflector 106 in a subscanning direction. While the document is so transported, a lamp 108 illuminates it in the main scanning direction. A reflection from the document is focused by a lens 110 onto an imaging device or CCD (Charge Coupled Device) array, whereby information carried on the document is read. Clocked by a synchronization control circuit 114, FIGS. 1A and 1B, the CCD array 112 delivers an analog signal representative of the incident imagewise light to a video amplifier 116 which is controlled by a read control circuit 118. An analog-to-digital converter (ADC) 120 converts the amplified analog signal outputted by the video amplifier 116 into multilevel digital image data pixel by pixel. The digital image data is fed to a shading correction circuit 122 for correcting distortions of the image data ascriable to the noise of document image, irregular light intensity distribution, contamination of the glass platen 104, irregular sensitivity distribution of the CCD array 112, etc. The so corrected image data is applied to an image processor 124 and thereby transformed into digital image data to be recorded. The image data from the image processor 124 is transferred to the image data storing section 200. In response, the image data storing section 200 writes the image data in any one of a plurality of page memories thereof which will be described with reference to FIG. 6. The image data stored in the page memory is applied to the copying section 300 to modulate a laser beam.

As shown in FIGS. 1A and 1B the copying section 300 has a line driver 302, a laser driver 304, a laser diode 306, a read synchronization control circuit 308, a write drive control circuit 310, and a driving unit 312. Digital image data read out of the page memory of the image storing section 200 is fed to the line driver 302 and then amplified by the laser driver 304. The digital image data to be recorded is a binary signal which assigns one bit (record/non-record) to each pixel. The laser driver 304 controllably energizes the laser diode 306 in response to the binary signal.

Figure 5:
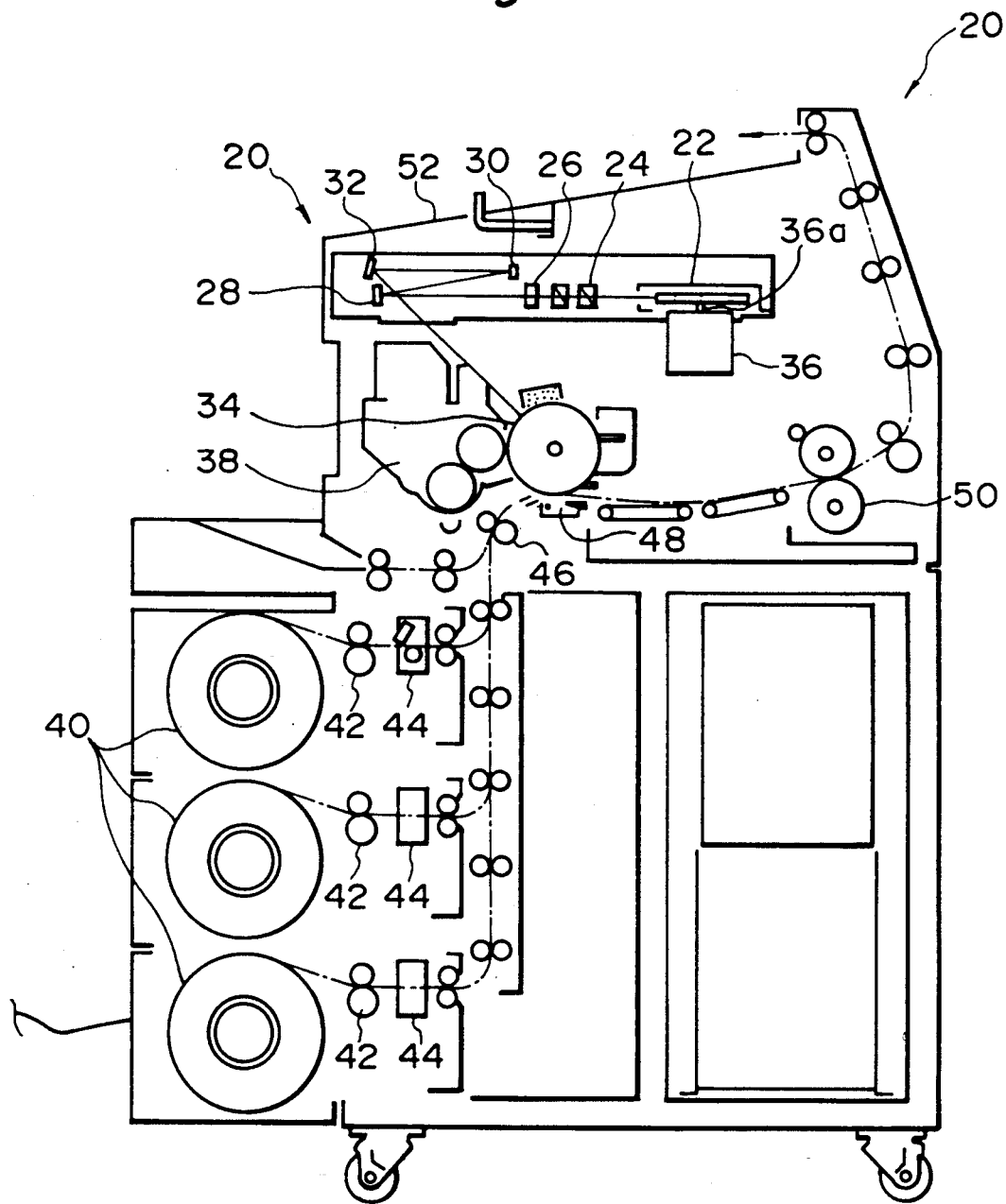
FIG. 5 is a sectional side elevation showing a specific construction of a digital copier implemented with the control device of FIG. 1.

Referring to FIG. 5, there is shown a digital copier 20 implemented with the image data storing section 200, copying section 300, and operating section 500. A laser beam issuing from the laser diode 306 is steered by a rotary polygonal mirror 22 and then routed through a cylindrical lens 24, an f-theta lens 26, a first to a third mirror 28, 30 and 32 to a photoconductive drum 34. The polygonal mirror 22 is affixed to the output shaft 36a of a motor 36. The motor 36 and, therefore, the polygonal mirror 22 is rotated at a constant speed. As a result, the mirror 22 steers the laser beam in a direction perpendicular to the rotating direction of the drum 34, i.e., in the axial direction of the drum 34 to cause it to scan the surface of the drum 34. The surface of the drum 34 is uniformly charged beforehand by a charger which is connected to a negative high-tension power source. Hence, the laser beam scanning the surface of the drum 34 photoelectrically dissipates the charge on the drum 34 via a grounding portion included in the drum 34. The laser diode 306 is turned off when the binary signal has a non-record level representative of a low document density or turned on when the binary signal has a record level representative of a high document density. As a result, the areas of the drum 34 corresponding to the low and high document densities are provided with a potential of about −750 volts and a potential of about −100 volts, respectively, whereby a latent image is electrostatically formed on the drum 34 in association with the density distribution of the document. A developing unit 38 develops the latent image to produce a toner image on the drum 34. Specifically, a toner stored in the developing unit 38 is charged to negative polarity by agitation while a bias voltage generator, not shown, applies a bias voltage of about −550 volts to the developing unit 38. Therefore, the toner deposits in those areas of the drum 34 where the surface potential is higher than the developing bias, forming a toner image corresponding to the document on the drum 34. Paper is paid out from any one of the rolls loaded on three trays 40 by a feed roller pair 42 and then cut by a cutter 44 in a suitable size. The cut length of the paper, or paper sheet, is transported along a path defined below the drum 34. At this instant, a transfer charger is activated to transfer the toner image from the drum 34 to the paper sheet. The paper sheet carrying the toner image thereon is driven to a fixing unit 50 which then fixes the toner on the paper sheet by heat. Thereafter, the paper sheet, or copy, is driven out to a tray 52.

The copier 20 has a housing which accommodates therein the image data storing section 200, system control section 400 and operating section 500, FIGS. 1A and 1B. As shown in FIGS. 1A and 1B, the reading section 100, copying section 300, image data storing section 200 and operating section 500 are interconnected by signal lines L1, L2 and L3 of RS 422 standards so as to interchange data serially at a rate of 9600 bits per second.

Figure 6:
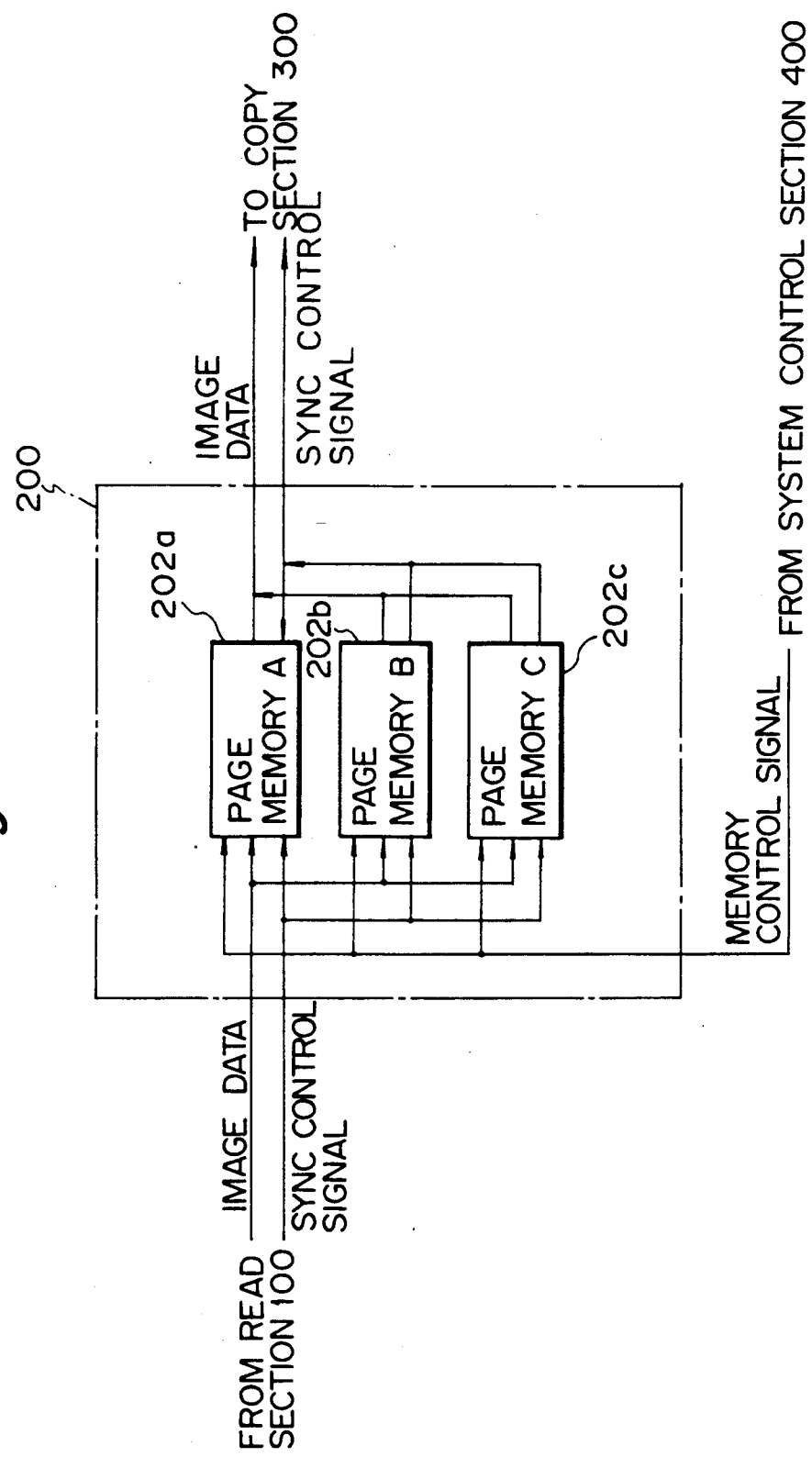
FIG. 6 is a block diagram showing a specific construction of an image data storing section included in the embodiment.
Figure 7:
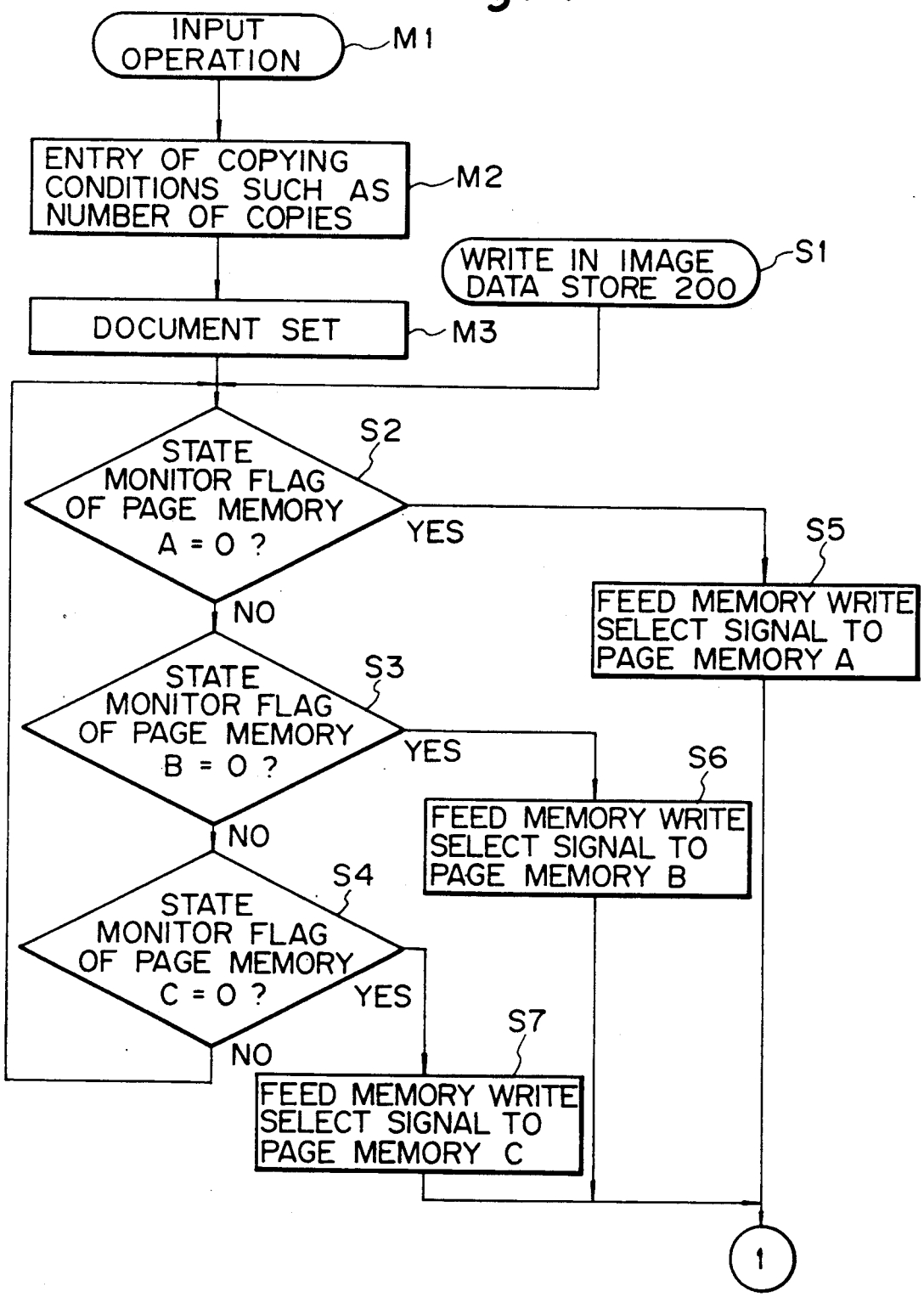

As shown in FIG. 6, the image data storing section 200 has three page memories A to C 202a to 202c. One of the page memories 202a to 202c is selected by a memory control signal fed from the system control section 400 to write or read digital image data thereoutof. Specifically, digital image data is written to selected one of the page memories in response to a synchronization control signal fed from the reading section 100, while digital image data is read out of the page memory in response to a synchronization control signal fed from the copying section 300.

Referring to FIGS. 7, 8A, 8B, and 9, a specific operation of the CPU 402 included in the system control section 400 will be described. On the turn-on of a power switch, the CPU 402 clears or initializes the I/O interface 414, RAM 406 and other similar components thereof. After resetting a state monitor flag which will be described, the CPU 402 turns on the ready indicator on the operation board 502 and then awaits a key input on the board 502. The operator enters a desired number of copies and other required copying conditions on the operation board 502 and, while the ready indicator is glowing, sets a document on the reading section 100 (steps M1 to M3, FIG. 7). Then, the CPU 402 turns off the ready indicator to inhibit the operator from inserting other documents. As the document is set on the reading section 100, a document sensor senses it and causes the read control circuit 118 to feed a read start signal code 4AH to the system control section 400 over the line L1. On receiving this signal, the CPU 402 of the system control section 400 sends a document data request signal code 4BH to the operation control circuit 504 over the line L3. In response, the operation control circuit 504 returns a copy ready code 4CH to the CPU 402 together with the various copying conditions entered on the operation board 502 (set number, magnification, density, etc.). On receiving the copy ready code 4HC over the line L3, the CPU 402 checks an M-BUSY bit (third bit) of a state monitor flag assigned to the page memory of the image data storing section 200. In this particular embodiment, the state monitor flag is assigned to each of the three page memories. Assuming that all the page memories A to C 202a to 202c are ready to write image data therein, then the M-BUSY bits of all the state monitor flags are "0". In this condition, the CPU 402 selects a particular page memory i (i=A, B or C) (steps S5 to S7) and then sends a write select signal to the page memory i. At the same time, the CPU 402 sets the M-BUSY bit of the state monitor flag associated with the page memory i.

FIGS. 10 and 11 show respectively specific address assignment and bit assignment of the state monitor flags. In the figures, the seventh bit labeled M-AVAIL is set when some page memory is available while the third bit labeled M-BUSY is set when image data is written to the page memory. The zero-th bit labeled M-DONT is set for inhibiting image data from being written to the page memory. It is only when M-AVAIL="1", M-BUSY="0" and M-DONT="0" that image data is allowed to be written to the page memory i.

In the steps S5 to S7, the M-BUSY bit of the RAM address 10000H is set when the page memory A is selected, the M-BUSY bit of the RAM address 10001H is set when the page memory B is selected, and the M-BUSY bit of the RAM address 10002H is set when the page memory C is selected.

Figure 8B:
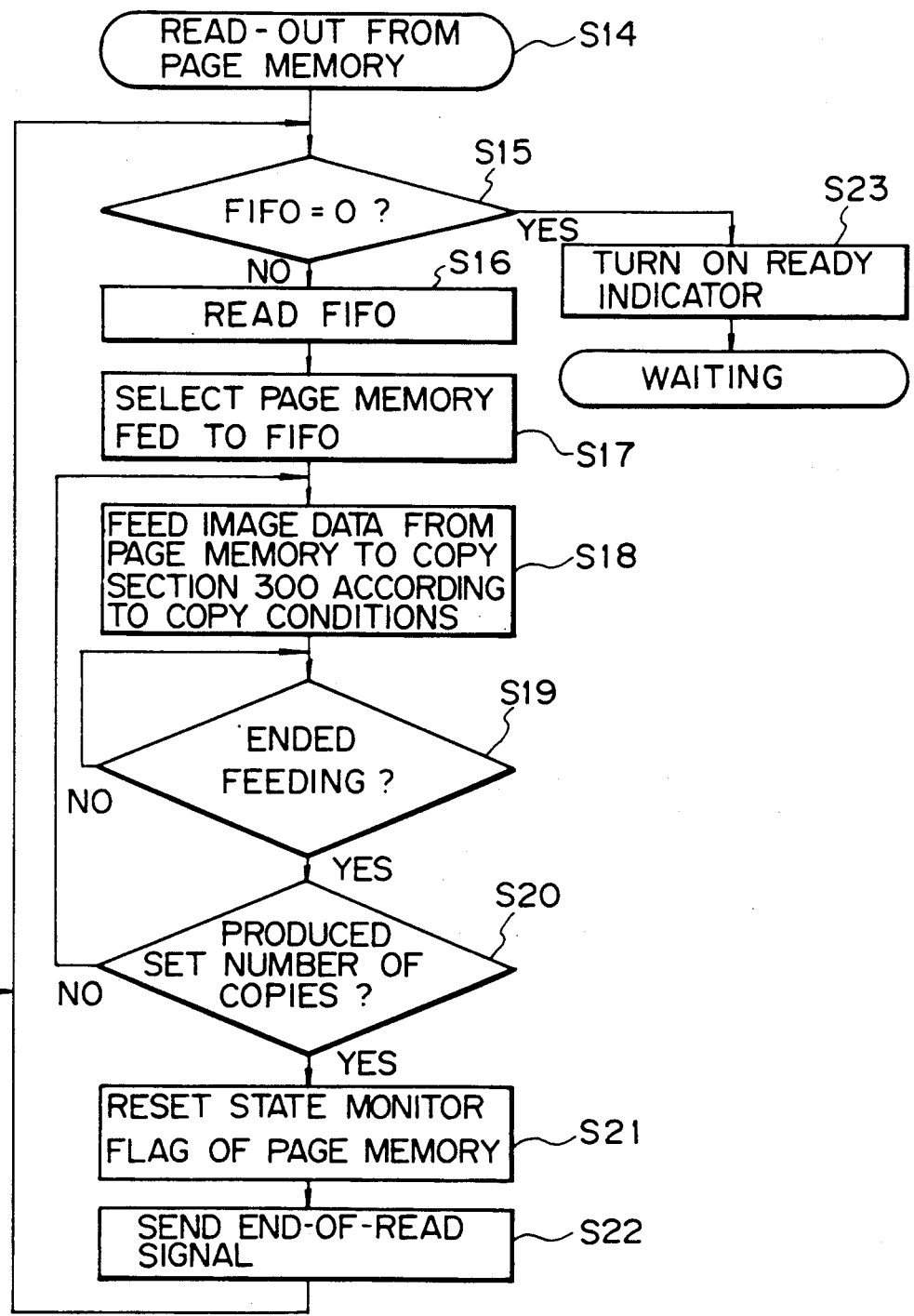
Figure 9:
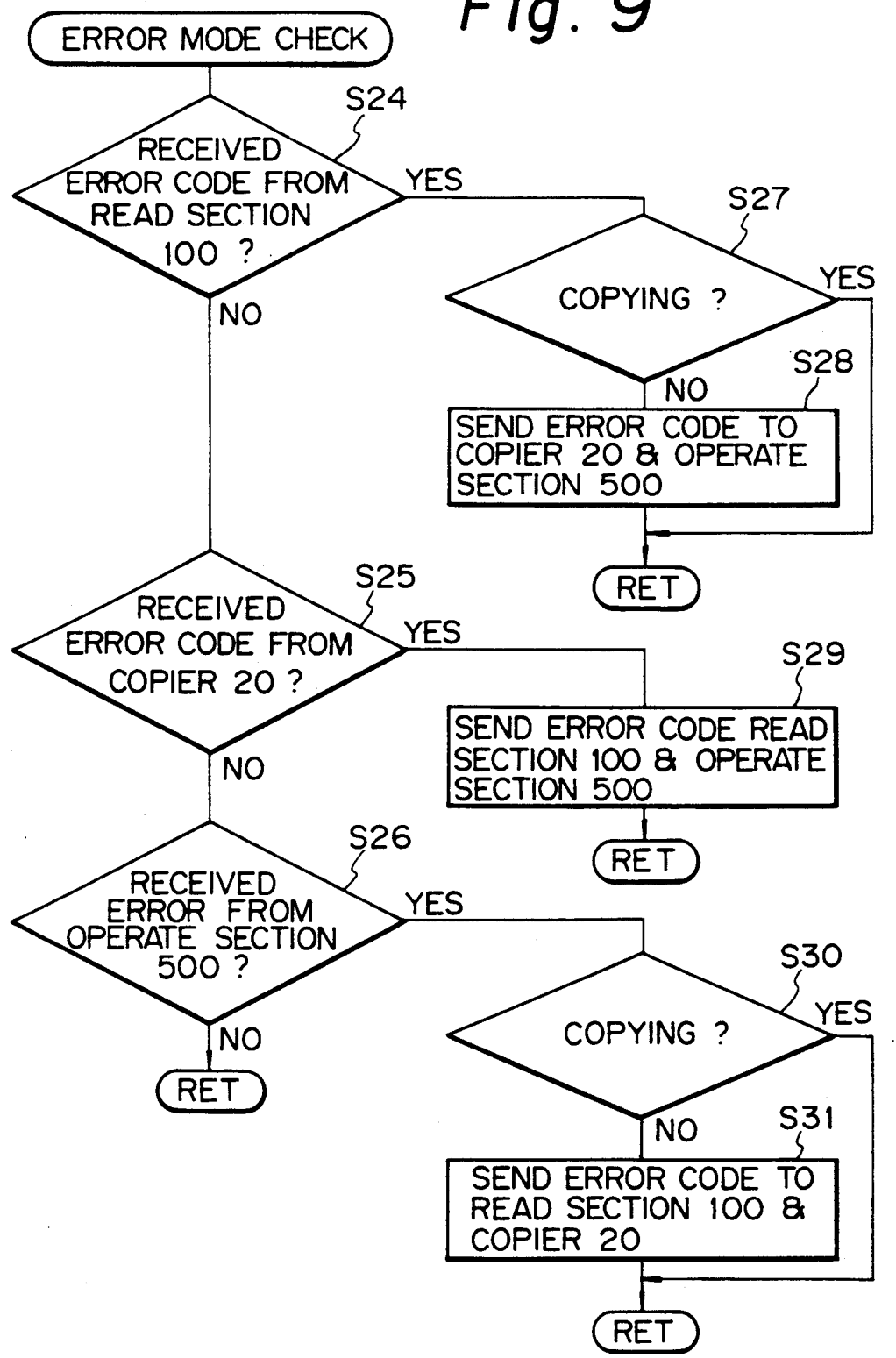

Subsequently, as shown in FIGS. 8A and 8B, a number assigned to the page memory i is written to a register FIFO while the copying conditions are written to a copy condition register (S8 and S9). The register FIFO is a memory included in 7-byte RAM area. Assume that the page memory A is selected, and that the number assigned thereto is "01H". Then, this code is written to the leading address of the FIFO of the RAM address 11000H, and the copying conditions are written to a copy condition register associated with the number "01H". When different documents are sequentially written to the image data storing section 200, then other corresponding numbers "02H" and "03H" will be written to the RAM addresses 11001H and 11002H, as shown in FIG. 10. When the preparations for writing a document are completed, the CPU 402 sends a read start command (document start signal code 4HD) to the read control circuit 118 of the reading section 100 (S10). On receiving this signal, the read control circuit 118 drives the roller pairs 102, FIG. 4, to transport the document to the glass platen 104. At this instant, in synchronism with the clock being generated by the synchronization control circuit 114, the image data storing section 200 and system control section 400 each receives image data, document length signal (WFGATE signal), and a line synchronizing signal (WLSYNC signal). At first, the WFGATE signal and WLSYNC signal are fed simultaneously to the page memory A, i.e., the WFGATE signal and WLSYNC signal are turned from OFF to ON at the time when the leading edge of the document is written. The WLSYNC signal appears every time the document is read by sixteen lines (1 millimeter), and the WFGATE signal turns from ON to OFF when the entire document is read. The CPU 402 counts WLSYNC signals appearing during the interval between ON and OFF of the WFGATE signal, i.e., while the document is read. The number of WLSYNC signals so counted is written to the RAM 406 of the system control section 400. In this manner, digital image data sent from the reading section 100 is written to the page memory i (S11).

Thereupon, the CPU 402 determines whether or not the writing operation has completed (S12). If the answer of the step S12 is YES, the CPU 402 increments a counter FIFO-CNT by one. The counter FIFO-CNT shows the bytes of the FIFO having been loaded with data and, at the same time, how many documents have been stored in the page memories. The CPU 402 checks the counter FIFO-CNT to see how many page memories have been occupied. When the content of the FIFO-CNT is "3", for example, it indicates that three documents have already been stored in the page memories and, therefore, no further documents cannot be read. In this condition, the ready indicator on the operation board 502 is not turned on. When the counter FIFO-CNT is smaller than "3", the ready indication is turned on since not all of the page memories have been occupied. In the illustrative condition, "01H" is stored in the leading address of the FIFO, and therefore the page memory A is caused into a read mode. At the same time, the copying conditions are fed to the copying section 300.

When the image data representative of the document is fully written to the page memory, the WFGATE signal turns to OFF. Then, the system control section 400 delivers a copy start signal code 4EH to the write drive control circuit 310 of the copying section 300 over the line L2. In response, the write drive control circuit 310 feeds a read line synchronizing signal (RLSYNC signal) and a read document length signal (RFGATE signal) generated by the read synchronization control signal 308 to the system control section 400 in synchronism with the the polygonal mirror 22, FIG. 5. The RLSYNC signal appears every time sixteen lines of data (1 millimeter) are read out of the page memory after the turn of the RFGATE signal to ON. The system control section 400 counts the RFGATE signals and, when it coincides with the number of WLSYNC signals counted at the time of reading, stops outputting image data from the page memory. The image data stored in the page memory is read out by the above two signals and fed from the image data storing section 200 to the line driver 302 of the copying section 300, whereby the document begins to be reproduced. The procedure described so far is repeated until the set number of copies have been produced.

More specifically, the CPU 402 checks the register FIFO (S15) to see the instantaneous condition of the image data storing section 200, i.e., the number of documents (page memories) having already been inputted but not reproduced yet. Since "01H" is stored in the leading address of the FIFO in the illustrative condition, digital image data stored in the page memory A is fed to the copying section 300 together with the copying conditions. Assuming that the desired number of copies is 100, then the image data is fed 100 times from the page memory A to the copying section 300. Thereafter, the M-BUSY bit of the state monitor flag assigned to the page memory A is cleared, i.e., "0" is written to the M-BUSY bit of the RAM address 10000H to allow new data to be written to the page memory A. At the same time, the FIFO is cleared, and an end-of-copy signal is fed to the copying section 300 and operating section 500. This is the end of the operation for reproducing the first document.

On starting reading image data out of the page memory A, the CPU 402 determines whether or not any other document has been set by the steps M1 to M3, as previously stated. If any other document exists, the CPU 402 executes the steps S1 to S4. If there is any page memory whose state monitor flag has "0" in the M-BUSY bit thereof, the CPU 402 executes the steps S5 to S12. If no document exists, the CPU 402 continuously executes the copy ending and document detecting procedure, advances to the step S1 when detected a document, clears the M-BUSY bit of the state monitor flag of the page memory when image data stored therein is fully reproduced, and then delivers an end-of-read signal (copy end) to the copying section 300 and operation control circuit 504. Hence, assuming that more than three documents are set on the reading section 100, image data representative of the second and third documents are respectively written to the page memories B and C while the operation for producing 100 copies of the first document is under way. When 100 copies of the first document are produced, the page memory A allows new image data to be written thereto, so that the fourth document can be read. Then, image data representative of the fourth document is written to the page memory A over the first document. During this period of time, image data of the second document is read and reproduced.

Assume that while the copying operation is repeated to produce the set number of copies of the first document, the second document is inserted. Then, the CPU 402 sends a read start signal code 4AH to the image data storing section 200 to execute the previously stated sequence, as with the first document. Assume that while the second document is read and written to the image data storing section 200, an error has occurred in the reading operation or in the interchange of the read start signal and other signals. Then, the read control circuit 118 detects the error and interrupts the operation under way immediately. The read control circuit 118 feeds an error code 50H representative of the error occurred in the reading section 100 to the system control section 400 which knows that the copying section 300 is operating. In response to the error code 50H, the system control section 400 determines whether or not the error is of the kind which will effect the copying operation. If the error is not of such a kind, the system control section 400 continues the copying operation and, on completing it, delivers the error code 50H to the operating section 500. When the error is removed within the reading section 100 before the end of the copying operation, the read control circuit 118 sends an error removal code to the system control section 400 which then invalidates the previously received error code 50H and does not deliver it to the operating section 500 (S24 to S31). In this manner, even when an error occurs in the reading operation while the copying operation is under way, the copying operation is continued without being interrupted.

Another specific sequence of steps representative of an alternative embodiment of the present invention will be described. The following description will concentrate on the steps different from the steps of the first embodiment.

Assume that the second document is inserted when the copying operation for producing the set number of copies of the first embodiment is under way. Then, the CPU 402 sends a read start signal code 4AH to the image data storing section 200 to execute the previously stated sequence of steps, as with the first document. Assume that a paper jam, roll end or similar error has occurred in the operation for reproducing the first document while the second document is read and written to the image data storing section 200. The write drive control circuit 310 detects the error and interrupts the copying operation under way immediately. The write drive control circuit 310 sends an error code 50H representative of the error to the system control section 400.

Regarding the second document, a document start signal code 4AH is fed to the system control section 400 as soon as it begins to be read. On receiving this code 4AH, the CPU 402 of the system control section 400 sends a command for executing the reading sequence to the operating section 500 and reading section 100, thereby executing the control for writing image data in the page memory. The system control section 400 knows the error having occurred in the copying secting 300 and, on receiving the error code 50H from the copying section 300, determines whether the error is of the kind which will effect the operation for reading the second document. If the error will not effect such an operation, the system control section 400 continues the reading operation and, on completing it, sends an error code 51H to the operating section 500. When the error is removed within the copying section 300 before the end of the reading operation, the write drive control circuit 310 sends an error removal code to the system control section 400 which then invalidates the previously received error code 51H and does not send it to the operating section 500. As a result, even when an error occurs in the operation for copying the first document while the operation for reading the second document is under way, the reading operation is continued to write the second document in the page memory.

Figure 12:
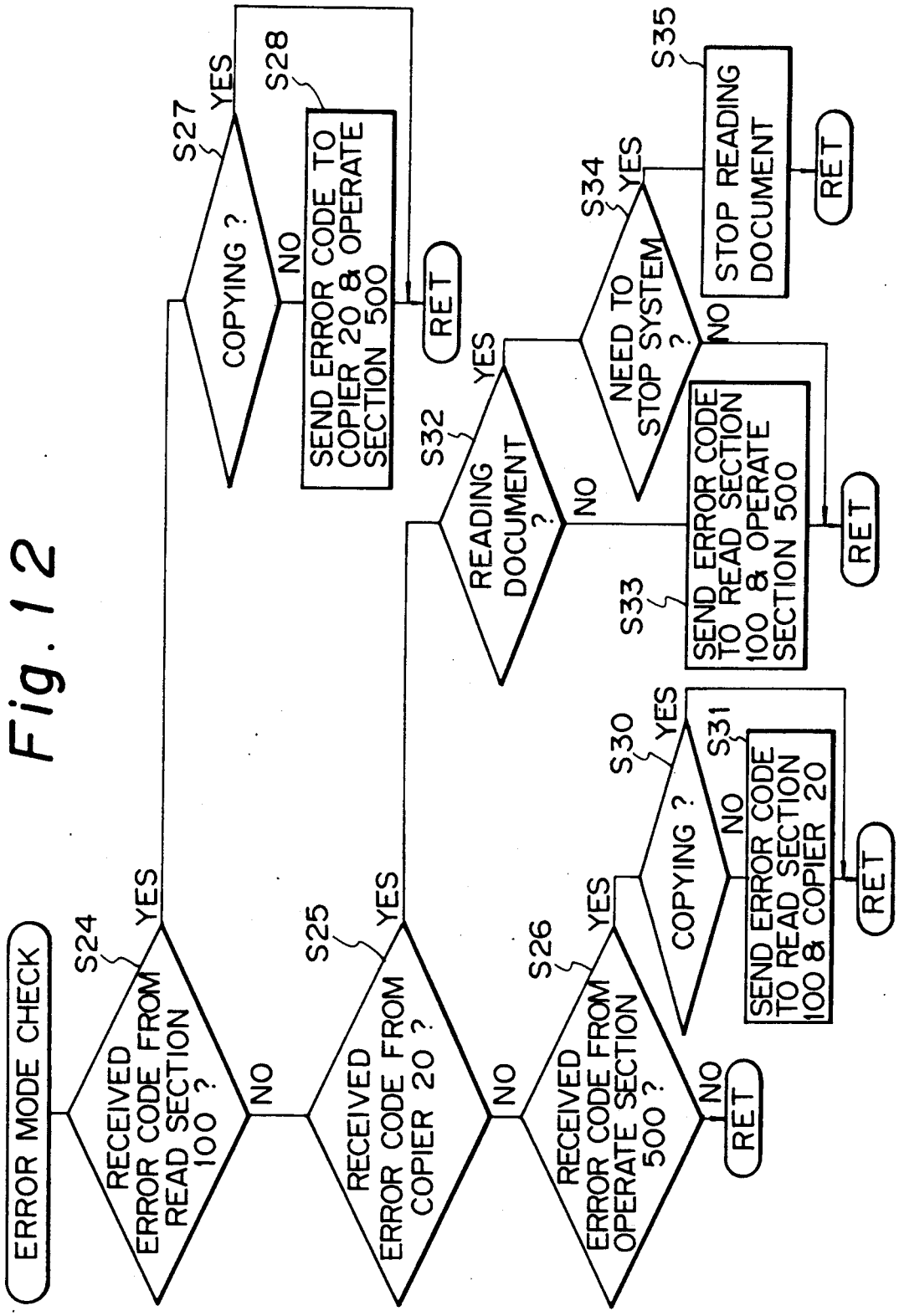
FIG. 12 is a flowchart showing a specific operation of a CPU representative of an alternative embodiment of the present invention.

More specifically, as shown in FIG. 12, assume that an error occurs in the copying section 300 when a document reading operation is under way (S32), i.e., the system control section 400 receives an error code from the copier 20 (S25). Then, the system control section 400 determines if the entire system has to be interrupted (S34) and, if the answer of the step S34 is NO, continues the document reading operation. If the answer of the step S34 is YES, the system control section 400 stops reading the document (S35). If a document reading operation is not under way (S32), the system control section 400 feeds an error code to the reading section 100 and operating section 500 (S33) even when an error exists in the copying section 300.

In summary, it will be seen that the present invention provides a digital copier capable of continuing an operation for copying a preceding document even when an error occurs in an operation for reading a succeeding document, thereby enhancing efficient copying operations.

Further, even when an error occurs in the operation for copying the preceding document, the copier of the present invention is capable of continuing the operation for reading the succeeding document, further promoting efficient copying operations.

Various modifications will become possible for those skilled in the art after receiving the teachings of the present disclosure without departing from the scope thereof.

What is claimed is:

1. A control device for a digital copier which writes digital image data and reads out said digital image data for reproduction, comprising:

image reading means for reading a document to produce a corresponding image density signal;

converting means for converting said image density signal into corresponding digital image data;

storing means for storing said digital image data representative of a plurality of documents;

reproducing means for reproducing said digital image data;

error detecting means for detecting an error occuring in said image reading means or in said reproducing means; and control means for controlling said image reading means, said converting means, said storing means, said reproducing means and said error detecting means such that said converting means converts the document read by said image reading means into digital image data, said digital image data is written to said storing means, and then said digital image data is read out of said storing means and reproduced by said reproducing means, and such that when an operation for reading a succeeding document begins while an operation for reading digital image data representative of a preceding document and causing said reproducing means to reproduce said image data is under way, said operation for reproducing said preceding document and said operation for reading said succeeding document each is completed with no regard to an error which may occur in the other operation.

2. A control device for a digital copier which writes digital image data and reads out said digital image data for reproduction, comprising:

image reading means for reading a document to produce a corresponding image density signal;

error detecting means for detecting an error occurring in said image reading means;

converting means for converting said image density signal into corresponding digital image data;

storing means for storing said converted digital image data representative of two or more documents;

reproducing means for reproducing said digital image data; and control means for controlling said image reading means, said error detecting means, said converting means, said storing means and said reproducing means such that said converting means converts the document read by said document reading means into corresponding digital image data, said converted digital image data is written to said storing means, and then said digital image data is read out and reproduced by said reproducing means, and such that when an operation for reading a succeeding document begins while an operation for reading digital image data representative of a preceding document and causing said reproducing means to reproduce said digital image data is under way, and an error is detected in said operation for reading said succeeding document, said operation for reproducing said preceding document is continued without interruption.

3. A control device for a digital copier which writes digital image data and reads out said digital image data for reproduction, comprising:

image reading means for reading a document to produce a corresponding image density signal;

converting means for converting said image density signal into corresponding digital image data;

storing means for storing said converted digital image data representative of a plurality of documents;

reproducing means for reproducing said digital image data;

error detecting means for detecting an error occurring in said reproducing means; and control means for controlling said image reading means, said converting means, said storing means, said reproducing means and said error detecting means such that said converting means converts the document read by said image reading means into corresponding digital image data, said digital image data is written to said storing means, and then said digital image data is read out and reproduced by said reproducing means, and such that when an operation for reading a succeeding document begins while an operation for reading said digital image data out of said storing means and causing said reproducing means to reproduce said digital image data is under way, and an error occurs in said operation for reproducing said preceding document, said operation for reading said succeeding document is continued without interruption.

* * * * *

UNITED STATES PATENT AND TRADEMARK OFFICE
CERTIFICATE OF CORRECTION

PATENT NO. : 5,055,935
DATED : October 8, 1991
INVENTOR(S) : Ohno

It is certified that error appears in the above-identified patent and that said Letters Patent is hereby corrected as shown below:

On the title page and in column one;

Please delete the title "CONTROL DEVICE FOR A DIGITAL COPIER WITH SIMULTANEOUS OPERATIONS FOR READING A SUCCEEDING IMAGE WHILE REPRODUCING A PRECEDING IMAGE WITHOUT INTERRUPTION OF EITHER OPERATION UPON DETECTING AN ERROR WITH THE OPERATION" and insert the correct title --CONTROL DEVICE FOR A DIGITAL COPIER WITH SIMULTANEOUS OPERATIONS FOR READING A SUCCEEDING IMAGE WITHOUT INTERRUPTION OF EITHER OPERATION UPON DETECTING AN ERROR WITH THE OTHER OPERATION--.

Signed and Sealed this

Twelfth Day of January, 1993

Attest:

DOUGLAS B. COMER

*Attesting Officer*       Acting Commissioner of Patents and Trademarks